US012670618B2

(12) United States Patent
Jeon et al.

(10) Patent No.: US 12,670,618 B2
(45) Date of Patent: Jun. 30, 2026

(54) APPARATUS AND METHOD FOR DETERMINING ROTATION ANGLE OF OBJECT, AND COMPUTER-READABLE STORAGE MEDIUM STORING INSTRUCTIONS TO PERFORM METHOD FOR DETERMINING ROTATION ANGLE OF OBJECT

(71) Applicant: Research & Business Foundation SUNGKYUNKWAN UNIVERSITY, Suwon-si (KR)

(72) Inventors: Jae Wook Jeon, Suwon-si (KR); Jung Rok Kim, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 286 days.

(21) Appl. No.: 18/372,957

(22) Filed: Sep. 26, 2023

(65) Prior Publication Data
US 2024/0202972 A1      Jun. 20, 2024

(30) Foreign Application Priority Data
Dec. 16, 2022      (KR) ........................ 10-2022-0176950

(51) Int. Cl.
*G06T 7/73*       (2017.01)
*G06V 10/40*      (2022.01)

(52) U.S. Cl.
CPC ............... *G06T 7/74* (2017.01); *G06V 10/40* (2022.01)

(58) Field of Classification Search
None
See application file for complete search history.

(56) References Cited

U.S. PATENT DOCUMENTS

| | | | | |
|---|---|---|---|---|
| 8,401,308 B2 * | 3/2013 | Nakamura | ......... | G06V 30/2504 |
| | | | | 382/209 |
| 2010/0195917 A1 * | 8/2010 | Kubota | ............... | G06F 18/2134 |
| | | | | 382/218 |
| 2014/0044361 A1 * | 2/2014 | Lee | ........................... | G06T 7/11 |
| | | | | 382/201 |

(Continued)

FOREIGN PATENT DOCUMENTS

JP         2011-107878 A      6/2011

OTHER PUBLICATIONS

Wu, J., Cui, Z., Sheng, V. S., Zhao, P., Su, D., & Gong, S. (2013). A Comparative Study of SIFT and its Variants. Measurement science review, 13(3), 122. (Year: 2013).*

(Continued)

*Primary Examiner* — Ian L Lemieux

(57)       ABSTRACT

The present disclosure relates to a determining method performed by a determining device, the method comprising: acquiring an image; extracting a first feature point from the image; matching the first feature point of an object included in the image with a second feature point of a template by comparing the extracted first feature point with the second feature point within the template in which the second feature point for a predetermined object is previously stored; and determining a rotation angle of the object included in the image by comparing angle information of the first feature point with angle information of the second feature point.

14 Claims, 6 Drawing Sheets

(56) References Cited

U.S. PATENT DOCUMENTS

| | | | |
|---|---|---|---|
| 2014/0270362 A1* | 9/2014 | Najafi Shoushtari | ........................ G06V 10/752 382/103 |
| 2015/0036938 A1* | 2/2015 | Kim | ..................... G06V 10/462 382/201 |
| 2015/0206029 A1* | 7/2015 | Chikano | .............. G06V 10/757 382/201 |

OTHER PUBLICATIONS

Request for the Submission of an Opinion for Korean Patent Application No. 10-2022-0176950, dated Aug. 7, 2025.

* cited by examiner

ANGLE INFORMATION : 68.5666
DESCRIPTOR : (10111 ... 110) --> 256bit

ANGLE INFORMATION : 26.1233
DESCRIPTOR : (00110 ... 010) -> 256bit

FIG. 4

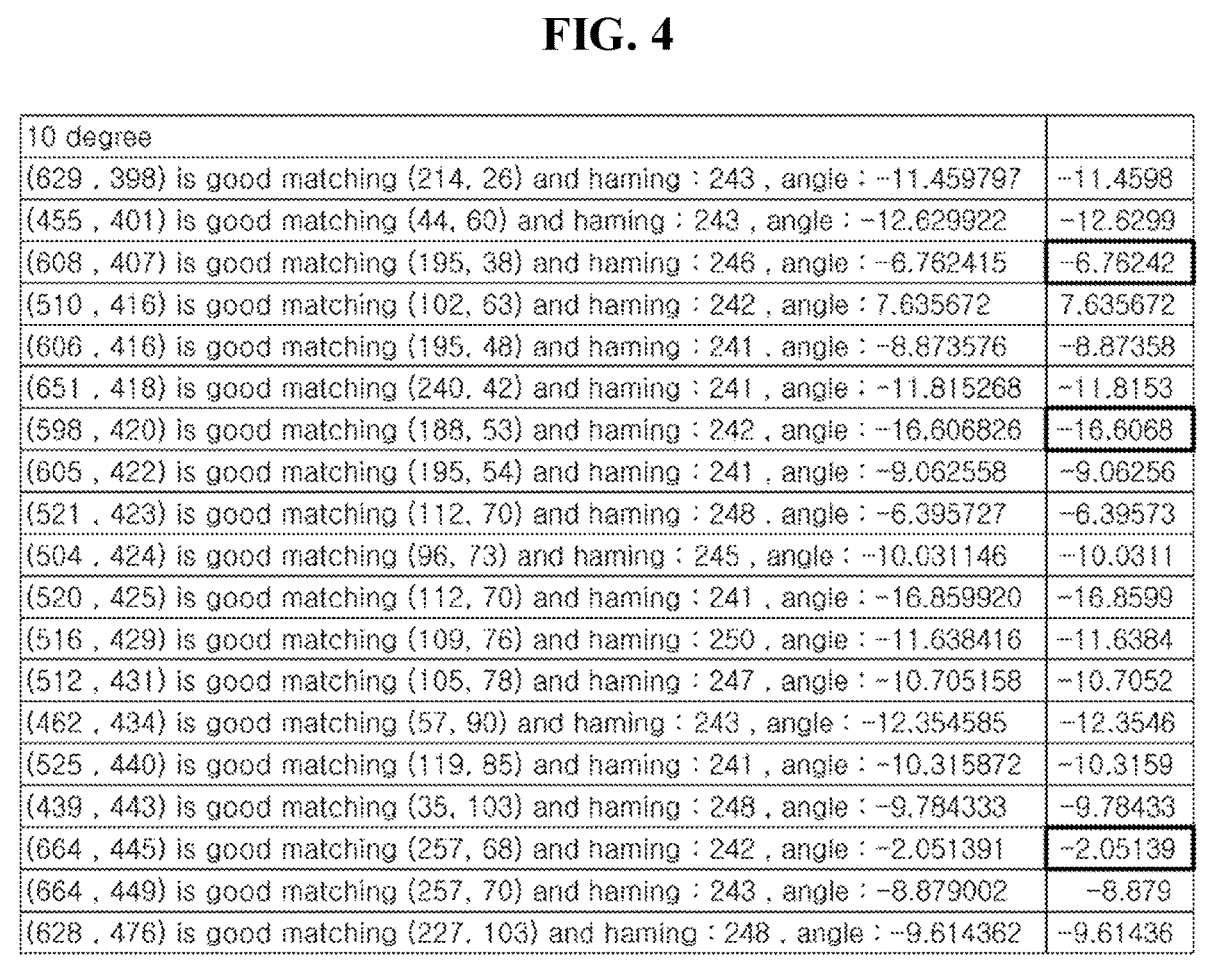

| 10 degree | |
|---|---|
| (629 , 398) is good matching (214, 26) and haming : 243 , angle : −11.459797 | −11.4598 |
| (455 , 401) is good matching (44, 60) and haming : 243 , angle : −12.629922 | −12.6299 |
| (608 , 407) is good matching (195, 38) and haming : 246 , angle : −6.762415 | −6.76242 |
| (510 , 416) is good matching (102, 63) and haming : 242 , angle : 7.635672 | 7.635672 |
| (606 , 416) is good matching (195, 48) and haming : 241 , angle : −8.873576 | −8.87358 |
| (651 , 418) is good matching (240, 42) and haming : 241 , angle : −11.815268 | −11.8153 |
| (598 , 420) is good matching (188, 53) and haming : 242 , angle : −16.606826 | −16.6068 |
| (605 , 422) is good matching (195, 54) and haming : 241 , angle : −9.062558 | −9.06256 |
| (521 , 423) is good matching (112, 70) and haming : 248 , angle : −6.395727 | −6.39573 |
| (504 , 424) is good matching (96, 73) and haming : 245 , angle : −10.031146 | −10.0311 |
| (520 , 425) is good matching (112, 70) and haming : 241 , angle : −16.859920 | −16.8599 |
| (516 , 429) is good matching (109, 76) and haming : 250 , angle : −11.638416 | −11.6384 |
| (512 , 431) is good matching (105, 78) and haming : 247 , angle : −10.705158 | −10.7052 |
| (462 , 434) is good matching (57, 90) and haming : 243 , angle : −12.354585 | −12.3546 |
| (525 , 440) is good matching (119, 85) and haming : 241 , angle : −10.315872 | −10.3159 |
| (439 , 443) is good matching (35, 103) and haming : 248 , angle : −9.784333 | −9.78433 |
| (664 , 445) is good matching (257, 68) and haming : 242 , angle : −2.051391 | −2.05139 |
| (664 , 449) is good matching (257, 70) and haming : 243 , angle : −8.879002 | −8.879 |
| (628 , 476) is good matching (227, 103) and haming : 248 , angle : −9.614362 | −9.61436 |

APPARATUS AND METHOD FOR DETERMINING ROTATION ANGLE OF OBJECT, AND COMPUTER-READABLE STORAGE MEDIUM STORING INSTRUCTIONS TO PERFORM METHOD FOR DETERMINING ROTATION ANGLE OF OBJECT

This work was supported by National Research Foundation of Korea, NRF grant funded by Korea government (MSIT; Ministry of Science and ICT) (Project unique No.: 1711161755; Project No.: 2020R1A2C3011286; and Research Project Title: Development of real-time scene understanding technology in complex traffic situations and bad weather).

TECHNICAL FIELD

The present disclosure relates to a device, method, computer-readable recording medium and computer program for determining a rotation angle of an object.

BACKGROUND

In order for a robot to stably pick up an object passing on a factory conveyor belt, it is necessary to accurately detect the type and angle of the object placed on the conveyor belt. However, a conventional object detection algorithm is problematic in that it is impossible to perform processing in real time, thus making it difficult to use in a factory conveyor belt environment. Since a conventional method of detecting the rotation angle of the object using an image moment method causes a significant error, there is a risk of damage to the object and thereby it has not yet been applied in practice to the conveyor belt.

Although the detection and tracking of the object and the detection of the rotation angle are important components in a computer vision field, an urgent problem of industry is to detect the object placed at various angles on the conveyor belt in real time and to accurately determine the rotation angle of the object.

SUMMARY

In accordance with a first aspect of the present disclosure, there is provided a determining apparatus, the apparatus comprise: a memory; and a processor executing one or more instructions stored in the memory, wherein the instructions, when executed by the processor, cause the processor to: acquire an image, extract a first feature point from the image, match the first feature point of an object included in the image with a second feature point of a template by comparing the extracted first feature point with the second feature point within the template in which the second feature point for a predetermined object is previously stored, and determine a rotation angle of the object included in the image by comparing angle information of the first feature point with angle information of the second feature point.

The processor may perform filtering to remove a data outlier among the angle information of the first feature point.

The processor may perform filtering to remove information outside a preset distribution range among the angle information of the first feature point on the basis of Z-score algorithm.

The object may correspond to the predetermined object, and the processor may determine the rotation angle of the object by comparing angle information of a filtered feature point among first feature points with angle information of a second feature point matched with the filtered first feature point to determine a rotation angle of the object.

The processor may determine the rotation angle of the object by calculating an angle difference between each filtered first feature point and the second feature point matched therewith, and calculating an average of calculated angle differences.

The processor may extract angle information from the first feature point, and extract a descriptor on the basis of the angle information of the first feature point.

The processor may specify the object included in the image by comparing the extracted descriptor with the descriptor previously stored in the template.

The processor may specify that the recognized object corresponds to the predetermined object of the template, when a distance calculated through Hamming distance calculation for the extracted descriptor and the descriptor previously stored in the template is equal to or less than a preset threshold.

In accordance with another aspect of the present disclosure, there is provided a method for determining a rotation angle of an object performed by a determining device, the method comprise: acquiring an image; extracting a first feature point from the image; matching the first feature point of an object included in the image with a second feature point of a template by comparing the extracted first feature point with the second feature point within the template in which the second feature point for a predetermined object is previously stored; and determining a rotation angle of the object included in the image by comparing angle information of the first feature point with angle information of the second feature point.

The determining method may further comprise filtering to remove a data outlier among the angle information of the first feature point, after the matching.

The filtering may include filtering to remove information outside a preset distribution range among the angle information of the first feature point on the basis of Z-score algorithm.

The object may correspond to the predetermined object, and the determining may comprise comparing angle information of a filtered feature point among first feature points with angle information of a second feature point matched with the filtered first feature point to determine a rotation angle of the object.

The determining may include calculating an angle difference between each filtered first feature point and the second feature point matched therewith, and averaging calculated angle differences, thus determining the rotation angle of the object included in the image.

The extracting may include extracting angle information from the first feature point, and extracting a descriptor on the basis of the angle information of the first feature point.

The matching may include specifying the object included in the image by comparing the extracted descriptor with the descriptor previously stored in the template.

The matching may include specifying that the recognized object corresponds to the predetermined object of the template, when a distance calculated through Hamming distance calculation for the extracted descriptor and the descriptor previously stored in the template is equal to or less than a preset threshold.

In accordance with another aspect of the present disclosure, there is provided a non-transitory computer-readable recording medium storing a computer program, which comprises instructions for a processor to perform a method for determining a rotation angle of an object, the method comprise: acquiring an image; extracting a first feature point from the image; matching the first feature point of an object included in the image with a second feature point of a template by comparing the extracted first feature point with the second feature point within the template in which the second feature point for a predetermined object is previously stored; and determining a rotation angle of the object included in the image by comparing angle information of the first feature point with angle information of the second feature point.

In view of the above, the present disclosure provides a technology that recognizes an object on a conveyor belt in real time to identify the type of the object, and simultaneously detects the rotation angle of the object, thus allowing a robot to stably pick up the object.

The objectives of the present disclosure are not limited to the above-mentioned objectives, and other objectives which are not mentioned will be clearly understood by those skilled in the art from the following description.

According to embodiments of the present disclosure, data outliers, falling outside a preset distribution range among the angle information of feature points included in an object recognized based on a template, are excluded to reduce an error in angle information, thereby allowing the rotation angle at which an object is placed on a conveyor belt to be determined with high accuracy. According to embodiments of the present disclosure, each module performing the function of object recognition, feature point determination, template matching, rotation angle determination, and error correction is implemented based on Verilog, thus allowing a robot to stably pick up an object passing on a conveyor belt in real time.

Effects of the present disclosure are not limited to the above-mentioned effects, and other effects which are not mentioned will be clearly understood by those skilled in the art from the following description.

BRIEF DESCRIPTION OF THE DRAWINGS

FIG. 4 is an exemplary diagram illustrating the operation of filtering data outliers that fall outside a preset distribution range among the angle information of a feature point.

DETAILED DESCRIPTION

Figure 1:
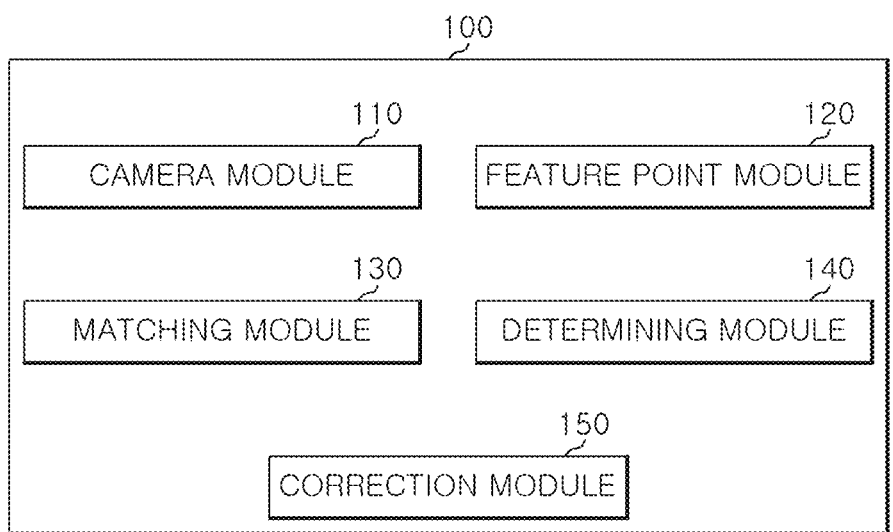
FIG. 1 is a functional block diagram illustrating a device for determining a rotation angle of an object according to an embodiment.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a functional block diagram illustrating a device 100 (hereinafter, referred to as a "determining device 100") for determining a rotation angle of an object according to an embodiment. Referring to FIG. 1, the determining device 100 according to an embodiment may include a camera module 110, a feature point module 120, a matching module 130, a determining module 140, and a correction module 150. Each module included in the determining device 100 according to an embodiment may be implemented as hardware that is operated based on Verilog, and each module included inn FIG. 1 may be operated as hardware that performs operations to be described later. The overall operation of each module included in the determining device 100 according to another embodiment may be performed by one or more processors. One or more processors may control the modules included in FIG. 1 to perform operations that will be described later.

The camera module 110 may acquire an image. The camera module 110 may acquire an image by photographing the surroundings or acquire an image from an external device. The camera module 110 may include a camera device that captures an image or a communication device that transmits or receives image data to or from the external device A feature point module 120 may extract a first feature point from the image. For instance, the feature point module 120 may convert the acquired image into a black-and-white image and apply FAST algorithm to the black-and-white image, thus detecting the first feature point. The feature point module 120 may perform the FAST algorithm including a FD (Feature Detection) step, a FS (Features Score) step, and a NMS (Non-Maximal Suppression) step.

For instance, in the FD step, the feature point module 120 may determine whether a corresponding point is a corner point considering 16 pixel values on a circle with the radius of 3 pixels having any point P in the image as a center. The feature point module 120 may determine the point P as the first feature point when there are n or more consecutive pixels with a value that is a higher or lower than the value of the point P by a certain level.

For instance, the feature point module 120 may exclude the first feature point having an outlier in an edge portion among first feature points detected in the FS step. The feature point module 120 may calculate the gradient of each detected feature point, delete a feature point whose gradient is equal to or greater than a certain threshold, and use the remaining first feature points.

For instance, when there are first feature points adjacent to each other in the NMS step, the feature point module 120 may compare gradient scores of adjacent first feature points and select to use only the first feature point having the highest score.

A method in which the feature point module 120 extracts the first feature point from the image using the FAST algorithm is merely illustrative, but the present disclosure is not limited thereto.

Figure 2:
FIG. 2 is an exemplary diagram illustrating the operation of extracting a feature point, angle information, and a descriptor from the object according to an embodiment.

FIG. 2 is an exemplary diagram illustrating the operation of extracting a feature point, angle information, and a descriptor from the object according to an embodiment.

Referring to FIG. 2, the feature point module 120 may extract the angle information from the first feature point, and extract the descriptor on the basis of the angle information of the first feature point. For instance, the feature point module 120 may extract the angle information and the descriptor from the first feature point through rBRIEF algorithm. For example, the feature point module 120 may extract the angle information of the feature point using the data distribution and normal vector of a patch made in a certain size with the first feature point as the center. For example, the feature point module 120 may compare between a center point at a location where the feature point is extract and its surrounding points to calculate a relation value indicating a relationship between the center point and the surrounding points, thus generating the descriptor. A method in which the feature point module 120 extracts the angle information and descriptor of the first feature point using the rBRIEF algorithm is merely illustrative, but the present disclosure is not limited to this method.

The matching module 130 may match the first feature point of the object included in the image with the second feature point of the template by comparing the extracted first feature point with the template in which the second feature point for a predetermined object is previously stored. The determining device 100 may store, in a memory, the template in which the descriptor and the angle information of the feature point about the predetermined object are previously extracted in the same method as the method of extracting the descriptor and the angle information of the feature point module 120 described above, and then are stored.

For instance, the matching module 130 may specify the object included in the image by comparing the descriptor extracted from the first feature point with the descriptor previously stored in each of a plurality of templates. By way of example, the matching module 130 may perform a Hamming distance calculation on the descriptor extracted from the first feature point and the descriptor previously stored in each of the plurality of templates. For example, the matching module 130 may calculate the average and variance of descriptors, and calculate the Hamming distance between the descriptors while comparing the descriptor of the first feature point and the descriptor of the second feature point included in each of the plurality of templates from a highest variance value to a lowest variance value. Thus, when the Hamming distance calculated for the descriptor of the first feature point and the descriptor of the second feature point included in a first template among the plurality of templates is equal to or less than a preset threshold, the matching module 130 may specify that the object included in the image is the object included in the first template.

The determining module 140 may determine the rotation angle of the object included in the image by comparing the angle information of the first feature point of the object included in the image with the angle information of the second feature point matched with the first feature point. For example, the determining module 140 may calculate a difference between the angle information of each first feature point and the angle information of the second feature point matched with each first feature point, and average the calculated difference values, thus determining the rotation angle at which the object included in the image is rotated relative to the object included in the template.

On the other hand, if a feature point pair that is incorrectly matched between the first feature point and the second feature point is included, the accuracy of the rotation angle determined by the determining module 140 is likely to decrease. The embodiment of this document can improve the accuracy of the determining module 140 through the correction module 150, which will be described later.

The correction module 150 may perform filtering to remove data outliers among the angle information of the first feature point. For instance, the correction module 150 may perform filtering to exclude angle information outside a preset distribution range among the angle information of the first feature point from matching with the second feature point on the basis of the Z-score algorithm. The Z-score algorithm is algorithm that calculates the average and variance for specific data and deletes data that is a certain amount of variance away from the average. The correction module 150 may repeatedly perform the Z-score algorithm (e.g. 3 times) according to settings to filter the data.

Figure 3:
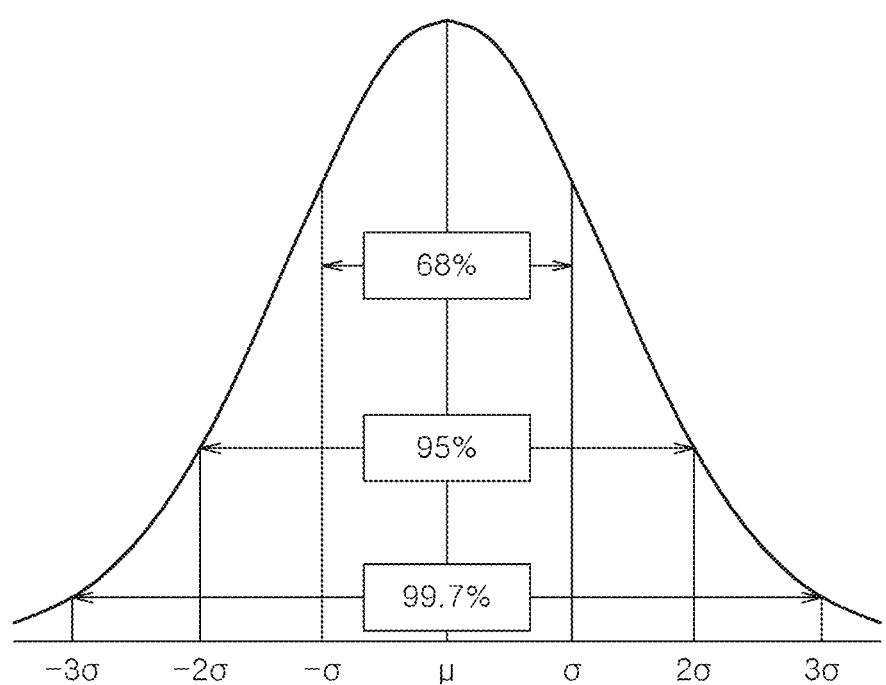
FIG. 3 is an exemplary diagram illustrating the operation of generating a normal distribution of angle information through Z-score algorithm according to an embodiment.

FIG. 3 is an exemplary diagram illustrating the operation of generating the normal distribution of the angle information through the Z-score algorithm according to an embodiment. FIG. 4 is an exemplary diagram illustrating the operation of filtering data outliers that fall outside a preset distribution range among the angle information of the feature point.

Referring to FIG. 3, the correction module 150 may generate the normal distribution for the angle information of the first feature point through the Z-score algorithm, and may select the first feature point having the angle information within the distribution range (e.g. within 68%, 95%, or 99.7%) selected by a manager. Referring to FIG. 4, the correction module 150 may perform filtering so that the first feature point having the angle information (e.g. −6.76242, −16.6068, and −2.05139 of FIG. 4) outside the preset distribution range does not match the second feature point.

Figure 5A:
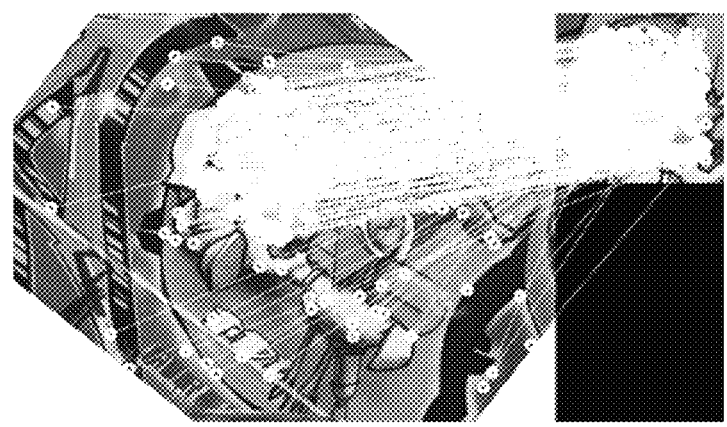
FIG. 5A is an exemplary diagram illustrating an embodiment in which no filtering is performed on angle information.
Figure 5B:
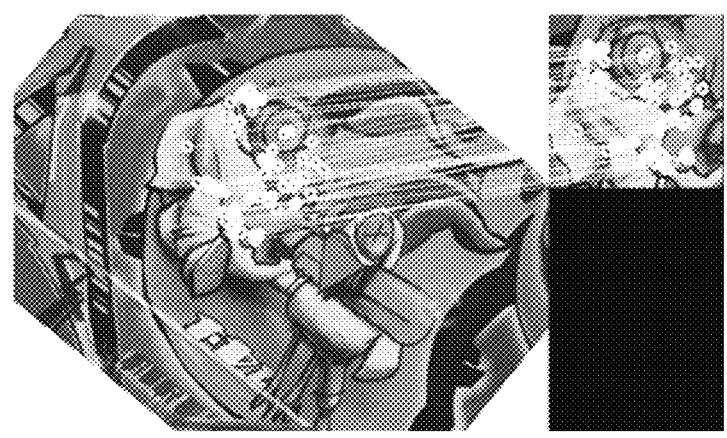
FIG. 5B is an exemplary diagram illustrating an embodiment in which filtering is performed on angle information three times, according to an embodiment.

FIG. 5A is an exemplary diagram illustrating an embodiment in which no filtering is performed on angle information and FIG. 5B is an exemplary diagram illustrating an embodiment in which filtering is performed on angle information three times, according to an embodiment.

Referring to FIG. 5A, the determining module 140 may determine the rotation angle of the object included in the image by comparing the angle information of the first feature point of the object included in the image with the angle information of the second feature point matched with the first feature point.

Referring to FIG. 5B, the determining module 140 may determine the rotation angle of the object included in the image by comparing the angle information of the filtered feature point among the first feature points with the angle information of the second feature point matched with the filtered first feature point, as the correction module 150 performs filtering. The determining module 140 may calculate a rotation angle difference between each of the filtered first feature points and the second feature point matched therewith, and average the calculated rotation angles, thus determining the rotation angle of the object included in the image. According to the embodiment of FIG. 5B, the performance of determining the rotation angle of the object included in the image according to the embodiment of this document is shown in Table 1 below.

TABLE 1

| Experiment with dataset used in ORB (Oriented FAST and Rotated BRIEF) algorithm | | |
| --- | --- | --- |
| Rotation angle | Determination value | Accuracy |
| 30 | 29.968939 | 99.89646333 |
| 31 | 31.019998 | 99.93549032 |
| 32 | 32.055693 | 99.82595938 |
| 33 | 32.952689 | 99.85663333 |
| 34 | 34.195188 | 99.42591765 |
| 35 | 35.175323 | 99.49907714 |
| 36 | 35.992011 | 99.97780833 |
| 37 | 36.797928 | 99.45385946 |
| 38 | 37.797573 | 99.46729737 |
| 39 | 38.774432 | 99.42162051 |
| 40 | 39.451963 | 98.6299075 |
| −50 | −49.839287 | 99.678574 |
| −51 | −50.821677 | 99.65084706 |
| −52 | −51.784498 | 99.58557308 |
| −53 | −52.716416 | 99.46493585 |
| −54 | −54.020526 | 99.96198889 |
| −55 | −54.871219 | 99.76585273 |
| −140 | −140.12532 | 99.91048643 |
| −141 | −141.05245 | 99.96279858 |
| −142 | −141.74587 | 99.82103803 |
| −143 | −143.10168 | 99.92889301 |
| −144 | −143.94114 | 99.95912778 |
| −145 | −144.75538 | 99.83129862 |
| −146 | −145.53098 | 99.67875068 |
| −147 | −146.55594 | 99.69792041 |
| −148 | −147.65441 | 99.76649054 |
| −149 | −148.81165 | 99.87359262 |
| Total | average | 99.70% |

Referring to Table 1, according to the result of determining the angle information by performing filtering on the angle information three times, the accuracy was about 99.70%.

Figure 6:
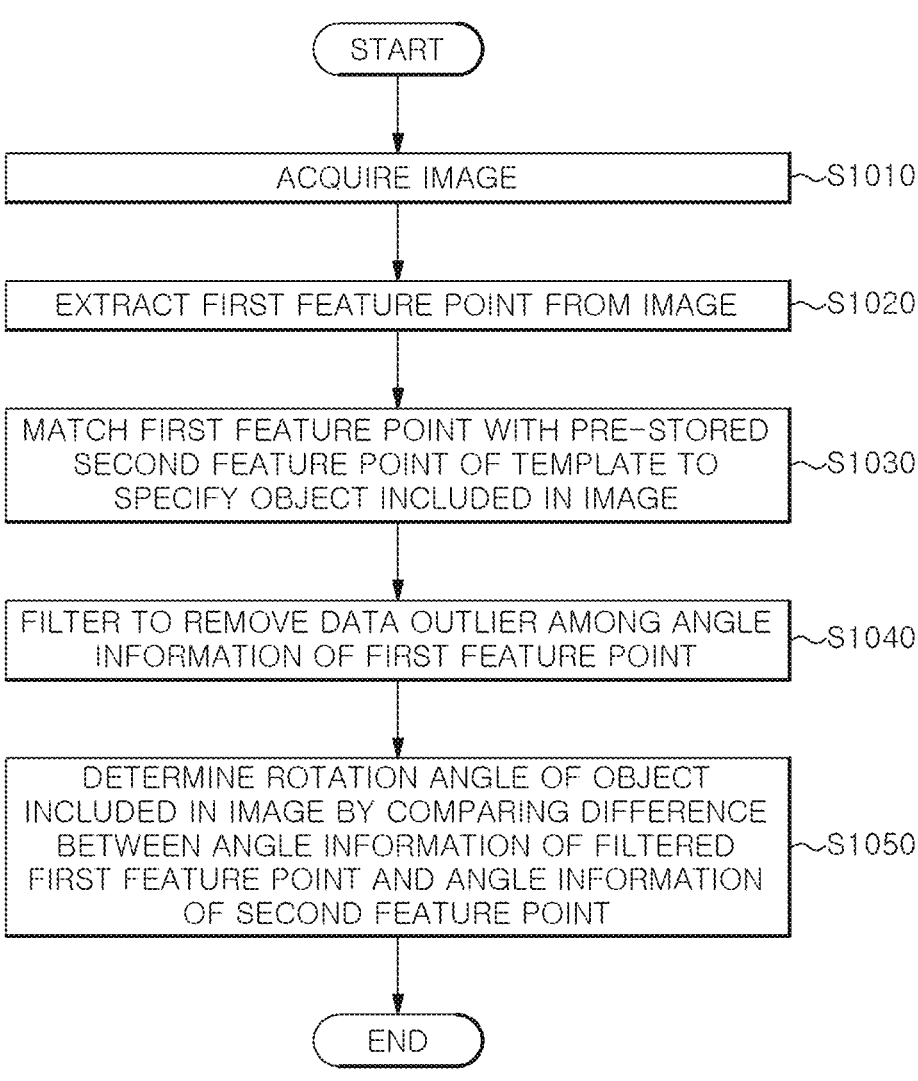
FIG. 6 is a flowchart of a method of determining a rotation angle of an object, which is performed by the device for determining the rotation angle of the object according to an embodiment.

FIG. 6 is a flowchart of a determining method performed by the determining device 100 according to an embodiment. Each step of the determining method in FIG. 6 may be performed by the determining device 100 described in FIG. 1, and each step will be described as follows.

In step S1010, the camera module 110 may acquire the image

In step S1020, the feature point module 120 may extract the first feature point from the acquired image.

In step S1030, the matching module 130 may match the first feature point with the pre-stored second feature point of the template to specify the object included in the image.

In step S1040, the correction module 150 may perform filtering to remove the data outlier among the angle information of the first feature point.

In step S1050, the determining module 140 may compare a difference between the angle information of the filtered first feature point and the angle information of the second feature point to determine the rotation angle of the object included in the image.

Meanwhile, in addition to the steps shown in FIG. 6, various embodiments in which the above-described camera module 110, feature point module 120, matching module 130, determining module 140, and correction module 150 perform operations described with reference to FIGS. 1 to 5 may be implemented. Thus, a new step performed by each module may be added to the steps of FIG. 6. Since the configuration of additional steps and the operation of performing the steps using components responsible for respective steps have been described in FIGS. 1 to 5, a duplicated description thereof will be omitted.

According to embodiments of the present disclosure, data outliers, falling outside a preset distribution range among the angle information of feature points included in an object recognized based on a template, are excluded to reduce an error in angle information, thereby allowing the rotation angle at which an object is placed on a conveyor belt to be determined with high accuracy. According to embodiments of the present disclosure, each module performing the function of object recognition, feature point determination, template matching, rotation angle determination, and error correction is implemented based on Verilog, thus allowing a robot to stably pick up an object passing on a conveyor belt in real time.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A determining apparatus for determining a rotation angle of an object, comprising:
   a memory; and
   a processor executing one or more instructions stored in the memory, wherein the instructions, when executed by the processor, cause the processor to:
   acquire an image,
   convert the image into a black-and-white image,
   extract a first feature point from the black-and-white image using a predetermined feature extraction algorithm,
   match the first feature point of the object included in the image with a second feature point of a template by comparing the extracted first feature point with the second feature point within the template in which the second feature point for a predetermined object is previously stored,
   determine the rotation angle of the object included in the image by comparing angle information of the first feature point with angle information of the second feature point, in which the rotation angle indicating an angle at which the object included in the image is rotated relative to an object included in the template,
   recognize the object based on the template,
   filter the angle information of the first feature point by identifying and removing data outlier values that deviate from a statistical distribution of the angle information, by using a statistical algorithm that calculates average and variance for the angle information of the first feature point to delete the data outlier that is a certain amount of variance away from the average, and
   delete the data outlier from the image for correcting an error in the angle information of the first feature point, thereby improving accuracy of the determined rotation angle for real-time robotic manipulation of the object on a conveyor belt.

2. The determining apparatus of claim 1, wherein the object corresponds to the predetermined object, and
   wherein the processor is configured to determine the rotation angle of the object by comparing angle information of a filtered feature point among first feature points with angle information of a second feature point matched with the filtered first feature point to determine a rotation angle of the object.

3. The determining apparatus of claim 2, wherein the processor is configured to determine the rotation angle of the object by calculating an angle difference between each filtered first feature point and the second feature point matched therewith, and calculating an average of calculated angle differences.

4. The determining apparatus of claim 1, wherein the processor is configured to extract angle information from the first feature point, and extract a descriptor on the basis of the angle information of the first feature point.

5. The determining apparatus of claim 4, wherein the processor is configured to specify the object included in the image by comparing the extracted descriptor with the descriptor previously stored in the template.

6. The determining apparatus of claim 5, wherein the processor is configured to specify that the recognized object corresponds to the predetermined object of the template, when a distance calculated through Hamming distance calculation for the extracted descriptor and the descriptor previously stored in the template is equal to or less than a preset threshold.

7. A method for determining a rotation angle of an object performed by a determining apparatus, the method comprising:
   acquiring an image;
   converting the image into a black-and-white image;
   extracting a first feature point from the black-and-white image using a predetermined feature extraction algorithm;
   matching the first feature point of the object included in the image with a second feature point of a template by comparing the extracted first feature point with the second feature point within the template in which the second feature point for a predetermined object is previously stored;
   determining the rotation angle of the object included in the image by comparing angle information of the first feature point with angle information of the second feature point,
   recognizing the object based on the template,
   filtering the angle information of the first feature point by identifying and removing data outlier values that deviate from a statistical distribution of the angle information, by using a statistical algorithm that calculates average and variance for the angle information of the first feature point to delete the data outlier that is a certain amount of variance away from the average, in which the rotation angle indicating an angle at which the object included in the image is rotated relative to an object included in the template, and
   deleting the data outlier from the image for correcting an error in the angle information of the first feature point, thereby improving accuracy of the determined rotation angle for real-time robotic manipulation of the object on a conveyor belt.

8. The determining method of claim 7, wherein the object corresponds to the predetermined object, and
   the determining includes comparing angle information of a filtered feature point among first feature points with angle information of a second feature point matched with the filtered first feature point to determine a rotation angle of the object.

9. The determining method of claim 8, wherein the determining includes calculating an angle difference between each filtered first feature point and the second feature point matched therewith, and averaging calculated angle differences, thus determining the rotation angle of the object included in the image.

10. The determining method of claim 7, wherein the extracting includes extracting angle information from the first feature point, and extracting a descriptor on the basis of the angle information of the first feature point.

11. The determining method of claim 10, wherein the matching includes specifying the object included in the image by comparing the extracted descriptor with the descriptor previously stored in the template.

12. The determining method of claim 11, wherein the matching includes specifying that the recognized object corresponds to the predetermined object of the template, when a distance calculated through Hamming distance calculation for the extracted descriptor and the descriptor previously stored in the template is equal to or less than a preset threshold.

13. A non-transitory computer readable storage medium including computer executable instructions, wherein the instructions, when executed by a processor, cause the processor to perform a method for determining a rotation angle of an object, the method comprising:

acquiring an image;

converting the image into a black-and-white image;

extracting a first feature point from the black-and-white image using a predetermined feature extraction algorithm;

matching the first feature point of an object included in the image with a second feature point of a template by comparing the extracted first feature point with the second feature point within the template in which the second feature point for a predetermined object is previously stored; and determining a rotation angle of the object included in the image by comparing angle information of the first feature point with angle information of the second feature point, recognizing the object based on the template, filtering the angle information of the first feature point by identifying and removing data outlier values that deviate from a statistical distribution of the angle information, by using a statistical algorithm that calculates average and variance for the angle information of the first feature point to delete the data outlier that is a certain amount of variance away from the average, in which the rotation angle indicating an angle at which the object included in the image is rotated relative to an object included in the template, and deleting the data outlier from the image for correcting an error in the angle information of the first feature point, thereby improving accuracy of the determined rotation angle for real-time robotic manipulation of the object on a conveyor belt.

14. The non-transitory computer readable storage medium of claim 13, wherein the object corresponds to the predetermined object, and the determining includes comparing angle information of a filtered feature point among first feature points with angle information of a second feature point matched with the filtered first feature point to determine a rotation angle of the object.

\* \* \* \* \*